March 3, 1953     J. A. GARBERG     2,630,147
POWER SAW GUIDE

Filed Jan. 5, 1951     2 SHEETS—SHEET 1

Inventor
J. Albert Garberg

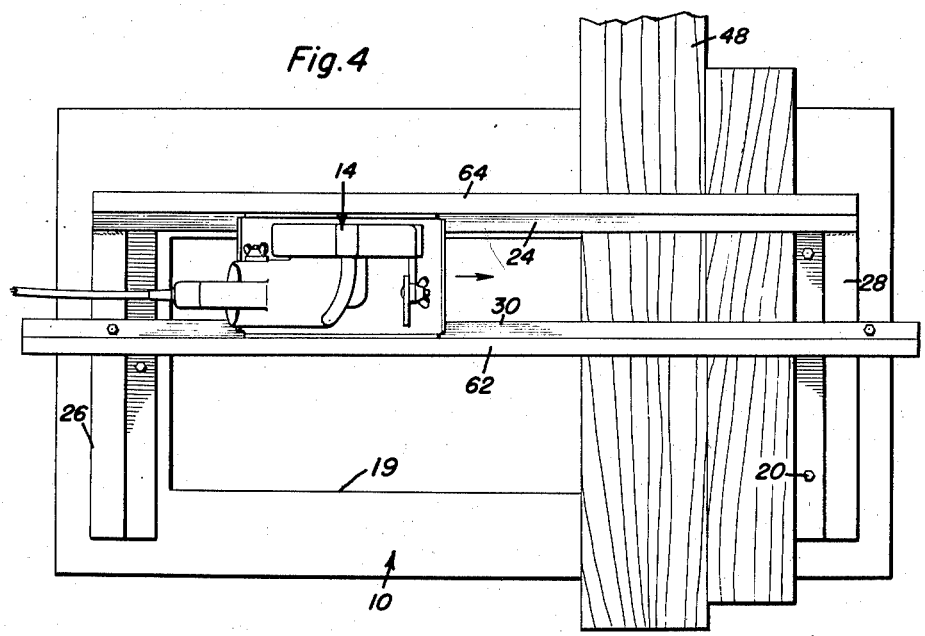

Patented Mar. 3, 1953

2,630,147

UNITED STATES PATENT OFFICE 2,630,147

POWER SAW GUIDE

J Albert Garberg, Casper, Wyo.

Application January 5, 1951, Serial No. 204,587

2 Claims. (Cl. 143—47)

The present invention relates to improvements in a power saw guide and more particularly to an apparatus which may be readily secured to the top of a work bench and which is adapted to support a conventional hand power saw for ripping and crosscutting planks and the like.

An object of the present invention is to provide an improved arrangement of power saw guiding means whereby the conventional hand power saw may be alternatively secured to a pair of guide bars for ripping and slidably supported by the pair of guide bars for crosscutting.

A further object of the present invention is to provide a power saw guide which is comprised of a plurality of Z-bars, three of these Z-bars being fixedly secured in angular relation to each other while the fourth Z-bar is laterally adjustable with respect to the parallel Z-bar whereby the conventional hand power saw may be disposed between the longitudinally extending and adjustably spaced guide bars.

Various other objects and advantages will become apparent from the detailed description to follow. The best form in which I have contemplated applying my invention is clearly illustrated in the accompanying drawings, wherein:

Figure 4 is a top plan view of the structure of the present invention when employed for crosscutting.

Figure 5 is a side elevational view of Figure 4 the top section;

Figure 6 is a detail sectional view taken substantially along the plane of line 6—6 of Figure 1.

Figure 1:
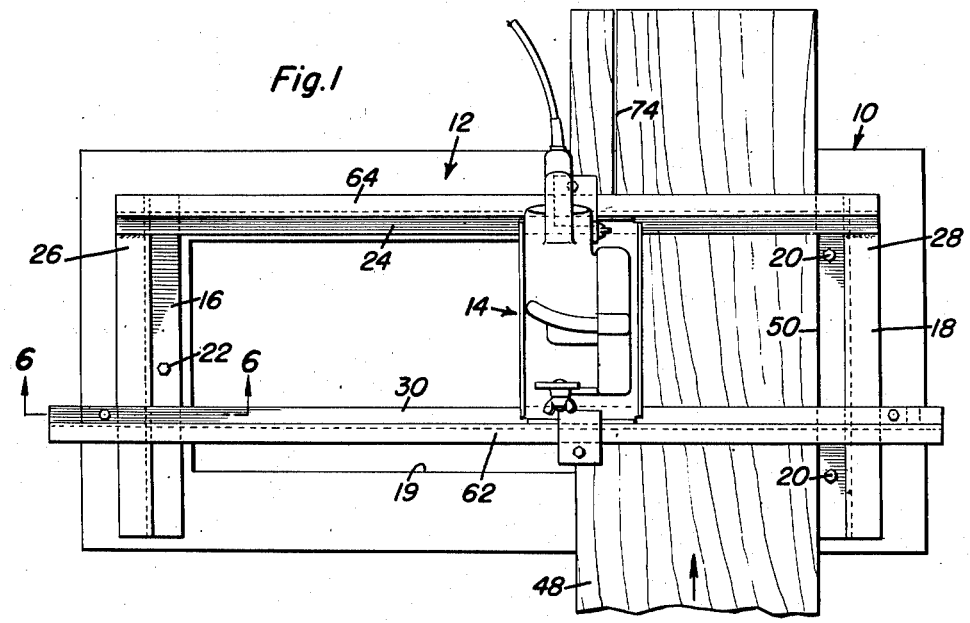
Figure 1 is a top plan view of the invention showing the conventional power saw clamped on the guide bars with a plank being moved in the direction of the arrow for ripping.

Referring more particularly to the drawings, wherein like numerals designate like parts throughout, the numeral 10 designates generally the work bench to which the power saw guide of the present invention may be secured while the numeral 12 designates generally the power saw guide and the numeral 14 designates generally a conventional hand power saw such as is commonly sold under the trade name "Skil-Saw."

The power saw guide 12 is comprised of a pair of transverse bars 16 and 18 of Z-cross section which are disposed in substantially parallel relation to each other on the bench 10. The transverse bars 16 and 18 are disposed adjacent the ends of the bench 10 and on either side of the opening 19 formed in the table, bolts 20 securing the bar 18 to the table while the bolt 22 secures the bar 16 to the table.

The longitudinally extending guide bar 24 has the ends thereof angularly extending from the transverse bars 16 and 18 and is secured thereto by means of weld or other conventional means to provide a substantially rectangular frame. It is to be noted that the longitudinally extending guide bar 24 is secured to the upper surface 26 and 28 of the transverse bars 16 and 18. In this manner, the guide bar 24 is mounted in spaced relation to the table 10 with the upper portions 26 and 28 of the transverse bars 16 and 18 extending in opposite directions and in parallel relation to the table.

Figure 2:
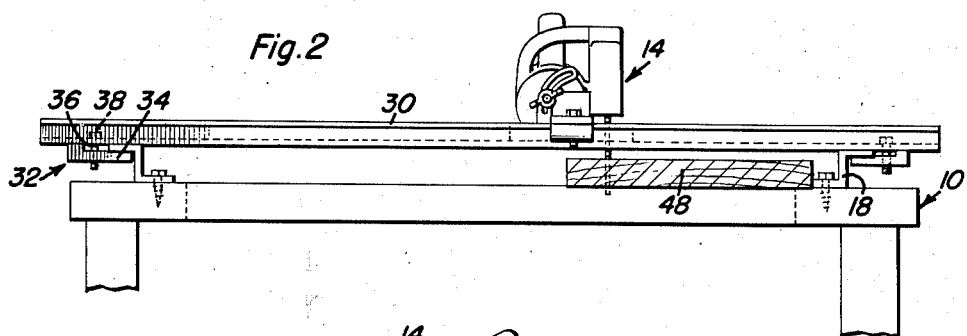
Figure 2 is an end elevational view of the structure of Figure 1.
Figure 3:
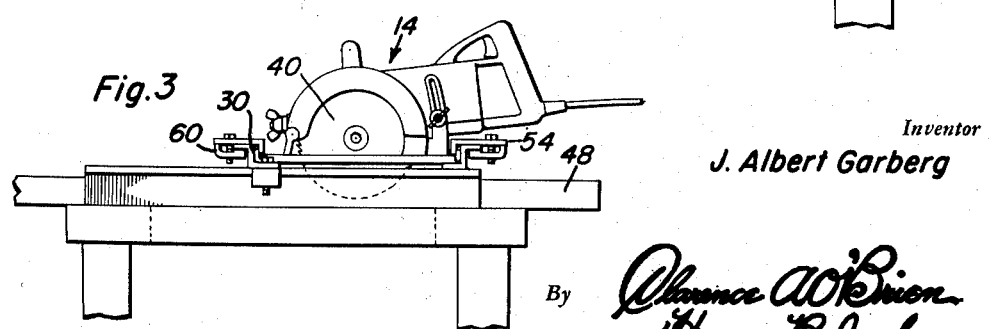
Figure 3 is an elevational view of Figure 1.

The second longitudinally extending guide bar 30 is also of Z-cross section but is substantially longer than the first guide bar 24. Second guide bar 30 is secured on the upper portions 26 and 28 of the transverse bars 16 and 18 and overlies the transverse bars at points evenly spaced from the first guide bar 24. The attaching means 32 is employed at each end of the second bar 30 for adjustably securing the guide bars in various positions along the transverse bars 16 and 18. The attaching means 32 is best shown in Figure 2 and includes clamping elements 34 having threaded apertures therethrough. Guide bar 30 is provided with apertures 36 through the lower portions of the Z-bar and adjacent to the outer edges of the upper portions of the transverse Z-bars 16 and 18. Screws 38 are disposed in the apertures 36 and engaged in the threaded apertures of the clamping elements 34 for adjustably securing the guide bar 30 to the transverse bars 16 and 18.

Inasmuch as the conventional power saw 14 is of well known form, a detailed description thereof is deemed unnecessary. Suffice it to say that the saw is provided with a cutting blade 40, a motor for rotating the cutter blade at 42, and a supporting plate 44 is secured to the frame of the power saw and normally provides a shoe for supporting the power saw on the guides when passed over the plank to be cut, the blade 40 extending through the slot in the plate 44. The plate 44 has upturned peripheral flanges 46 for a purpose to be presently described.

When it is desired to rip cut the plank 48 or the like, the guide bars 24 and 30 are disposed in spaced relation as in Figure 1. The power saw 14 is mounted thereon in the desired spaced relation from the guide edge 50 of the transverse bar 18. The clamping means 52 is employed for fixedly securing power saw 14 in the desired position.

The clamping means 52 includes an angulated clamping plate 54 having a downwardly extended angulated end 56 integral therewith. A clamping element 58 is provided with a first projecting portion 60 which is adapted to underlie the upper portions of each of the guide bars 24 and 30 at 62 and 64. The element 58 is also provided with a second projecting portion 66 which is adapted to engage the outer under edge of the clamping plate 50 which is disposed over the upper portions 62 and 64 of each of the respective guide bars. Clamp screws 68 extend through the clamping plate 50 and clamping element 58 to secure the same in clamped relation of the upper portions 62 and 64 of the guide bars. The downwardly extending angulated end 56 of the clamping plate 50 and clamping element 58 cooperate to secure the same in clamped relation of the upper portions 62 and 64 of the guide bars. The downwardly extending angulated end 56 of the clamping plate 50 is adapted to engage the inner surface of the peripheral flanges 46 to maintain them in clamped relation against the upstanding portions 70 and 72 of the guide bars 24 and 30.

It will thus be seen that when the power saw is clamped in the relation shown in Figure 1, the plank 48 may be guided under the guide bars 24 and 30 and against the surface 50 so that the plate 40 rips along the line 74 as shown.

When it is desired to crosscut the plank, the guide bar 30 is readjusted to the position shown in Figure 4 and clamped by means of the screws 38 in the selected position. The power saw 14 may then be disposed for guiding movement of the lower portions of the guide bars 24 and 30, no clamping means being employed for the crosscutting operation. The power saw may then be laterally moved to crosscut the planks wherever desired.

From the foregoing description and the accompanying drawings, it is believed that the advantages thereof will be readily apparent to one skilled in the art and it is further believed that a device has been provided which will accomplish all of the objects hereinabove set forth.

Having described the invention, what is claimed as new is:

1. A saw guide for guiding over a work supporting table the elongated rectangular base of a power hand saw when said base is turned to extend endwise or sidewise across the table for rip and cross cutting by the saw respectively, said guide comprising a pair of transverse bars fixed on the table at opposite ends thereof, a pair of longitudinal parallel bars surmounting said transverse bars and being of Z-shape in cross section to provide opposed lower right angle guideways above the work adapted for slidable fitting of said base therein and further providing upright outturned lateral flanges on said longitudinal bars, one of said longitudinal bars being adjustable on the transverse bars laterally of the other to space said guideways apart in accordance with the length or width of said base for slidable fitting of the base therein when said base is turned to extend endwise or sidewise across the table, and clamps on the bottom of said one longitudinal bar engaging said transverse bars to retain said one longitudinal bar in adjusted position.

2. A saw guide according to claim 1, and clamps straddling said flanges and engageable with said base for locking said base against sliding in said guideways.

J ALBERT GARBERG.

REFERENCES CITED

The following references are of record in the file of this patent:

UNITED STATES PATENTS

| Number | Name | Date |
|---|---|---|
| 1,369,684 | Maddox | Feb. 22, 1921 |
| 1,457,492 | Bloodgood | June 5, 1923 |
| 1,792,204 | Wallace et al. | Feb. 10, 1931 |
| 1,832,283 | Earhart | Nov. 17, 1931 |
| 1,911,045 | Tinnen | May 23, 1933 |
| 1,932,511 | Clarke | Oct. 31, 1933 |
| 2,353,794 | Swikhart | July 18, 1944 |
| 2,568,957 | Hess | Sept. 25, 1951 |